(12) United States Patent
Hynecek

(10) Patent No.: US 8,383,216 B1
(45) Date of Patent: Feb. 26, 2013

(54) CASE FOR A PORTABLE ELECTRONIC DEVICE WITH OVER-MOLDED THERMO-FORMED FILM

(75) Inventor: Bryan Lee Hynecek, Redwood City, CA (US)

(73) Assignee: Speculative Product Design, LLC, Mountain View, CA (US)

( * ) Notice: Subject to any disclaimer, the term of this patent is extended or adjusted under 35 U.S.C. 154(b) by 0 days.

(21) Appl. No.: 13/620,491

(22) Filed: Sep. 14, 2012

Related U.S. Application Data

(60) Provisional application No. 61/536,437, filed on Sep. 19, 2011.

(51) Int. Cl.
 *B29D 22/00* (2006.01)
 *B29D 23/00* (2006.01)
 *B32B 1/08* (2006.01)

(52) U.S. Cl. ............ 428/35.7; 428/35.2; 428/36.8; 428/500; 156/73.1; 156/73.5; 156/242; 156/267; 156/308.2; 224/246; 224/907; 224/929; 361/679.02; 455/90.3; 455/128; 455/550; 455/550.1; 455/575.1; 455/575.3; 455/575.4; 455/575.5; 455/575.6; 455/575.8; D03/215; D03/218; D03/303

(58) Field of Classification Search ............ 428/35.7, 428/35.2, 36.8, 500; 156/73.1, 73.5, 242, 156/267, 308.2; 224/246, 907, 929; 361/679.02; 455/90.3, 128, 550, 550.1, 575.1, 575.3, 455/575.4, 575.5, 575.6, 575.8; D03/215, D03/218, 303

See application file for complete search history.

(56) References Cited

U.S. PATENT DOCUMENTS

| | | | |
|---|---|---|---|
| 5,816,459 | A | 10/1998 | Armistead |
| 6,109,434 | A | 8/2000 | Howard, Jr. |
| 7,428,427 | B2 | 9/2008 | Brunstrom et al. |
| 7,436,653 | B2 | 10/2008 | Yang et al. |
| 7,555,325 | B2 | 6/2009 | Goros |
| 7,609,512 | B2 | 10/2009 | Richardson et al. |
| 7,623,898 | B2 | 11/2009 | Holmberg |
| D617,784 | S | 6/2010 | Richardson et al. |
| 7,781,034 | B2 | 8/2010 | Yializis et al. |
| 7,933,123 | B2 | 4/2011 | Wang et al. |
| 7,957,524 | B2 | 6/2011 | Chipping |
| 8,142,880 | B2 | 3/2012 | Tsao et al. |
| 8,231,099 | B2 | 7/2012 | Chen |
| 8,252,408 | B2 | 8/2012 | Uchida et al. |
| 2003/0136504 | A1 | 7/2003 | Sakamoto |
| 2005/0070673 | A1 | 3/2005 | Novak et al. |

(Continued)

FOREIGN PATENT DOCUMENTS

| | | |
|---|---|---|
| EP | 2189873 | 5/2010 |
| EP | 2478792 | 7/2012 |

(Continued)

OTHER PUBLICATIONS

Ballistic Shell Gel Series Case For LG Thrill 4g/Optimus 3d—Gray/Black, Source: http://www.cellularoutfitter.com/p-87513-Ballistic-Shell-Gel-Series-Case-for-LG-Thrill-4G-Optimus-3D---Gray-Black.html?id=shopping&, Date Accessed: Aug. 30, 2012, 2 pages.

(Continued)

*Primary Examiner* — Michael C Miggins
(74) *Attorney, Agent, or Firm* — SNR Denton US LLP

(57) ABSTRACT

The present disclosure relates to a case for a personal electronic device comprising one or more layers formed from a thin-film thermo-formed material and methods to manufacture the same. In a disclosed embodiment, the case for the personal electronic device comprises a flexible inner layer and a thin-film thermo-formed outer-layer.

11 Claims, 3 Drawing Sheets

U.S. PATENT DOCUMENTS

| | | | |
|---|---|---|---|
| 2009/0080153 | A1 | 3/2009 | Richardson et al. |
| 2009/0181229 | A1 | 7/2009 | Mase |
| 2010/0096284 | A1 | 4/2010 | Bau |
| 2010/0104814 | A1 | 4/2010 | Richardson et al. |
| 2010/0203931 | A1 | 8/2010 | Hynecek et al. |
| 2011/0163642 | A1 | 7/2011 | Rohrbach et al. |
| 2012/0037523 | A1 | 2/2012 | Diebel et al. |
| 2012/0037524 | A1 | 2/2012 | Lonsdale, II et al. |
| 2012/0088558 | A1 | 4/2012 | Song |
| 2012/0112031 | A1 | 5/2012 | Gormick et al. |
| 2012/0118628 | A1 | 5/2012 | Pakula et al. |
| 2012/0194982 | A1 | 8/2012 | Hishida |
| 2012/0211382 | A1 | 8/2012 | Rayner |
| 2012/0295045 | A1 | 11/2012 | Tang et al. |

FOREIGN PATENT DOCUMENTS

| | | |
|---|---|---|
| WO | WO0196100 | 12/2001 |
| WO | WO2004050343 | 6/2004 |
| WO | WO2008014405 | 1/2008 |
| WO | WO2010022651 | 3/2010 |

OTHER PUBLICATIONS

Griffin Technology—Reveal Hard Shell For Apple® Iphone® 4—White, Source: Http://www.bestbuy.com/site/Griffin-Technology---Reveal-Hard-Shell-Case-for-Apple%26%23174%3B-iPhone%26%23174%3B-4---White/2808035.p?id=1218352572979&skuId=2808035, Date Accessed: Aug. 31, 2012, 1 page.

Vacuum-Formed Films For Fit and Function, Source: http://machinedesign.com/content/term/304/smetrics.machinedesign.com?page=76%2CF, Date Accessed: Aug. 30, 2012, 3 pages.

Ballistic Shell Gel Series Case for LG Thrill 4g/Optimus 3d—Gray/Black, Source: http://www.cellularoutfitter.com/p-87513-Ballistic-Shell-Gel-Series-Case-for-LG-Thrill-4G-Optimus-3D—Gray-Black.html?id=shopping&, Date Accessed: Aug. 30, 2012, 2 pages.

Griffin Technology—Reveal Hard Shell Case for Apple® Iphone® 4—White, Source: http://www.bestbuy.com/site/Griffin-Technology—Reveal-Hard-Shell-Case-for-Apple%26%23174%3B-iPhone%26%23174%3B-4—White/2808035.p?id=1218352572979&skuId=2808035, Date Accessed: Aug. 31, 2012, 1 page.

International Search Report and Written Opinion dated Nov. 13, 2012 in corresponding International Application No. PCT/US2012/05519 filed Sep. 19, 2011, 7 pages.

Iphone 4/4S Speck Candyshell View Case—Black/Pomodoro, Source: http://www.mytrendyphone.co.uk/shop/iphone-4-4s-64965p.html, Date Accessed: Aug. 31, 2012, 2 pages.

Vacuum-Formed Films For Fit And Function, Source: http://machinedesign.com/content/term/304/smetrics.machinedesign.com?page=76%2C4, Date Accessed: Aug. 30, 2012, 3 pages.

CASE FOR A PORTABLE ELECTRONIC DEVICE WITH OVER-MOLDED THERMO-FORMED FILM

CROSS-REFERENCE

The present application claims the benefit of U.S. Provisional Application No. 61/536,437 filed Sep. 19, 2011, which is incorporated herein by reference in its entirety.

BACKGROUND

1. Field of Invention

The present disclosure relates generally to protective cases for an electronic device and specifically to cases that include at least a flexible inner layer and a thermo-formed outer layer.

2. Description of the Background

Mobile phones, smart phones, tablet computers, personal readers, personal electronic assistants, MP3 players as well as other portable electronic devices are widely used and have become a ubiquitous part of every day life. Such devices, although designed to be used in real world environments, often contain sensitive electronics and are subject to damage if dropped from a normal operating position. Despite attempts to design these complicated electronic devices for real world application, it is often necessary to utilize some form of protective case to shield and protect the electronic devices from damage due to drops or falls. Many different types and designs of cases exist and provide a wide range of protection. Cases may range from purely decorative to utilitarian, from soft pliable cases, to co-molded soft and hard cases to rigid cases. Soft case tend to provide less protection then rigid cases but are easy to use and easy to install on an electronic device. Rigid cases provide maximum protection, but due to the nature of the rigid materials it is often hard or not possible to insert the electronic device into a case molded from a single piece. Accordingly, most rigid cases often composed of multiple parts such as a front and back or top and bottom which may increase their size and the thickness of the materials used and the overall bulk of the device. They often need to be snapped together and assembled around the device to form a rigid shell for the device. Traditional co-molded cases, having soft and hard layers provide the optimum balance of flexibility and protection, but due to traditional manufacturing techniques, often result in cases with thicker then necessary outer case resulting in cases that add significant bulk to the device. It is therefore desirable to have a multilayer case that provides protection and flexibility while reducing the thickness and weight of the outer case. An embodiment of the present application discloses such a device.

The present disclosure provides for a case that protects an enclosed personal electronic device and is manufactured using techniques that enable a thin film thermo-formed outer layer.

SUMMARY

Embodiments of the disclosed case may include at least two layers; a flexible inner layer and a thermo-formed thin film outer layer.

In some embodiments, the thermo-formed thin film outer layer may enable the flexible inner layer to be manufactured from a softer, more flexible material than would otherwise be preferred because, for example, the thermo-formed thin film outer layer contributes to the overall rigidity of the case without adding significant bulk. In an embodiment, the thin-film outer layer is between 0.178 mm to 0.5 mm and more preferably in the 0.188 mm or 0.25 mm range. The thinner a film, the much finer detailed designs are possible. These thin films allow for deep draw conditions, but are easier to deform and break. Thicker films do not produce as intricate detail designs, are harder to form in deep draw conditions, but offer more rigidity and protection to the case as a whole.

In some embodiments, the case may be flexible enough so that it deforms to accommodate the insertion of a portable electronic device and, following insertion, return to its original shape.

In an embodiment, the thermo-formed thin film outer layer may be manufactured from a hard plastic so that it contributes to the overall rigidity of the case and protection of the enclosed personal electronic device.

In other embodiments, a pattern or graphic may be printed upon the thermo-formed thin film outer layer either prior to or following the thermo-forming process. Also, the thermo-formed thin film outer layer may provide a smooth, no-stick exterior to the case and thereby allow for easy removal of the case from a user's pocket and/or for manufactured finishes that can't be achieved with other non-smooth substances like rubber or silicon.

In many embodiments, the thermo-formed thin film outer layer may cover the entire back surface and a substantial portion of the side surfaces of the flexible elastomeric inner layer.

In an embodiment, a case for a portable electronic device comprising: a flexible elastomeric inner layer having an inner portion and an outer portion. The inner portion has a back portion and a side portion forming an enclosure for the portable electronic device and the flexible elastomeric inner layer has an attachment for retaining the portable electronic device within the enclosure, and the case further comprises a thermo-formed thin film outer-layer sized and shaped to cover the outer portion of the flexible elastomeric inner layer.

In still another embodiment, the thermo-formed thin film outer layer is attached to the flexible elastomeric inner layer. In still another embodiment, the thermo-formed thin film outer layer is permanently attached to the flexible elastomeric inner layer by chemical bonding, thermal bonding, co-molding or mechanical attachments.

In still another embodiment, the thermo-formed thin film outer layer substantially covers the outer portion of the flexible elastomeric inner layer. In still another embodiment, the thermo-formed thin film outer-layer is sufficiently deformable to allow for insertion of the personal electronic device into the enclosure, and the thermo-formed thin film outer-layer returns to its original shape after insertion of the personal electronic device into the enclosure.

In still another embodiment, the thermo-formed thin film outer-layer is formed from at least plastic, polyethylene terephthalate, polycarbonate, polypropylen, biaxially oriented polypropylene, oriented polypropylene, styrene, amorphous polyester terephthalate, or biaxially oriented polyethylene terephthalate. In still another embodiment, the flexible elastomeric inner layer is formed from at least silicone, rubber, neoprene, thermoplastic polyurethane or thermoplastic elastomer.

In still another embodiment, the thermo-formed thin film outer-layer has a thermo-formed thin film outer-layer inner surface and a thermo-formed thin film outer-layer outer surface, and the thermo-formed thin film outer-layer inner surface contacts the outer surface of the flexible elastomeric inner layer, and the thermo-formed thin film outer-layer outer surface contains a graphic.

In still another embodiment, the thermo-formed thin film outer-layer outer surface is smooth.

A method for forming a case for a personal electronic device with a thermo-formed thin film outer-layer and a flexible elastomeric inner layer is disclosed. The method comprises the steps of applying a sheet of thermo-formed film to a form, forming a thin film outer-layer from the thermo-formed film, trimming the formed thin film outer-layer to its final configuration, and attaching the trimmed thin film outer-layer to a flexible elastomeric inner layer. In another embodiment, the attaching is performed by co-molding, chemical bonding,
vibration welding, thermal bonding, or mechanical bonding.

BRIEF DESCRIPTION OF THE DRAWINGS

The methods, and devices described herein are further described in terms of particular embodiments. These embodiments are described in detail with reference to the drawings. These embodiments are non-limiting embodiments, in which like reference numerals represent similar structures throughout the several views of the drawings, and wherein.

DETAILED DESCRIPTION

Figure 1:
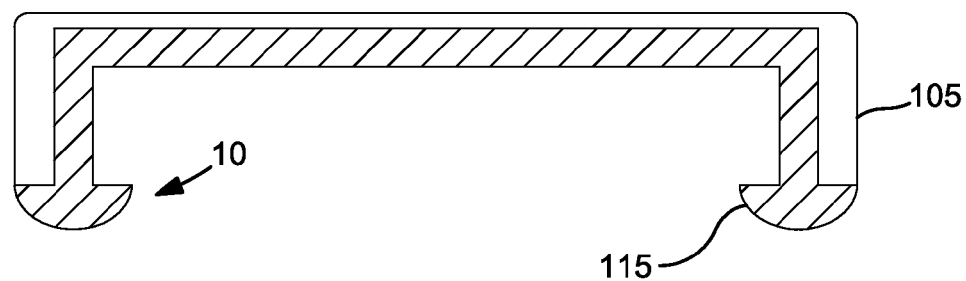
FIG. 1 depicts a cross-sectional view of a case in accordance with an embodiment of the present disclosure.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, and/or components, have been described at a relatively high-level, without detail, in order to avoid unnecessarily obscuring aspects of the present teachings.

In general, the flexible inner layer, comprising an elastomeric material such as TPU or TPE, and/or thermo-formed thin film outer-layer may act to protect an enclosed personal electronic device from damage due to, for example, exposure to dirt or contaminants, impact, or shock.

Thermo-forming the outer layer allows the material comprising the outer layer to be thinner than if manufactured using a traditional injection-molding process. The flexible inner layer may be shaped to enclose a portable electronic device, such as a mobile phone, laptop computer, or tablet computer. The flexible inner layer may have a back surface and one or more side surfaces shaped to cover the back and one or more of the side surfaces of the personal electronic device, respectively.

The flexible inner layer may be made from any appropriately flexible elastomeric material, such as rubber, silicon, neoprene, plastic, thermoplastic polyurethane (TPU) or thermoplastic elastomer (TPE) and may include a mechanism for maintaining the attachment between the case and the portable electronic device. Some attachment mechanisms include clips, extensions, adhesive materials, overhangs, bezels, detents, tabs, friction, or a magnetic material. The flexible inner layer may be any color or pattern of colors. The surface of the flexible inner layer that contacts the portable electronic device may be smooth or contoured and may contain dimples, cutouts, texturing, relief grooves, or any other patterning. The internal texturing may be decorative and/or may contribute to the function or protection of the device and may enhance adhesion of the flexible inner layer to the portable electronic device.

The thermo-formed thin film outer-layer may be manufactured from any appropriate thin film material such as plastic or polyethylene terephthalate (PET), polycarbonate (PC), polypropylene (PP), biaxially oriented polypropylene (BOPP), oriented polypropylene (OPP), styrene, amorphous polyester terephthalate (APET), or biaxially oriented polyethylene terephthalate (BoPET) and may be sized and shaped to snugly fit over and cover an outer portion of the flexible inner layer via any thermo-forming process, such as vacuum forming, chemical forming, thermal forming, pressure forming, high pressure forming or compression forming. In an embodiment, the thin-film outer layer is between 0.178 mm to 0.5 mm and more preferably in the 0.188 mm or 0.25 mm range. In another embodiments, the thermo-formed thin film outer-layer covers all or substantially all of the flexible inner layer.

The thermo-formed thin film outer-layer may be affixed to the flexible elastomeric inner layer by any method including, but not limited to clips, adhesives, interlocking parts, epoxy, co-molding, chemical bonding, vibration welding, thermal bonding, mechanical bonding, heat bonding, molding, or vibration welding.

FIG. 1 depicts a cross section of a multilayer cases in accordance with an embodiment of the present disclosure. Thermo-formed thin film outer-layer 105 is depicted in contact with flexible inner layer 115. Flexible inner layer 115 forms an enclosure 20 into which a portable electronic device may be inserted. In this embodiment, attachment 10 used to retain the portable electronic device within enclosure 20 is incorporated into flexible inner layer 115. It is understood, that attachment 10 may be integrated into or separate from flexible inner layer 115. As will be understood by one skilled in the art, the present disclosure is not limited to only two layers, but may employ multiple thermo-formed thin film and flexible layers to form a multiple layer case. For example, and not limitation, a case of the present disclosure could combine a first thermo-formed thin film layer with a flexible layer and a second thermo-formed thin film layer to form a case of the present disclosure.

Figure 2A:
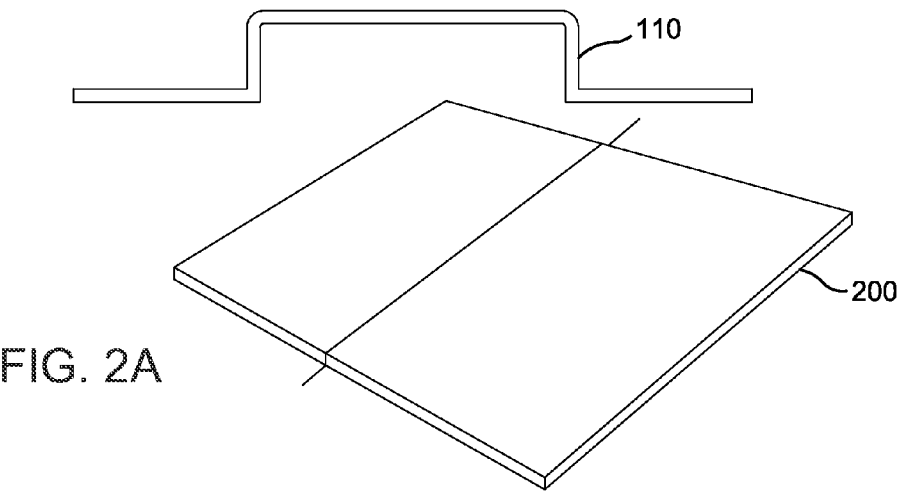
FIGS. 2A-2C illustrate the steps of a method of forming a case in accordance with an embodiment of the present disclosure.
Figure 2B:
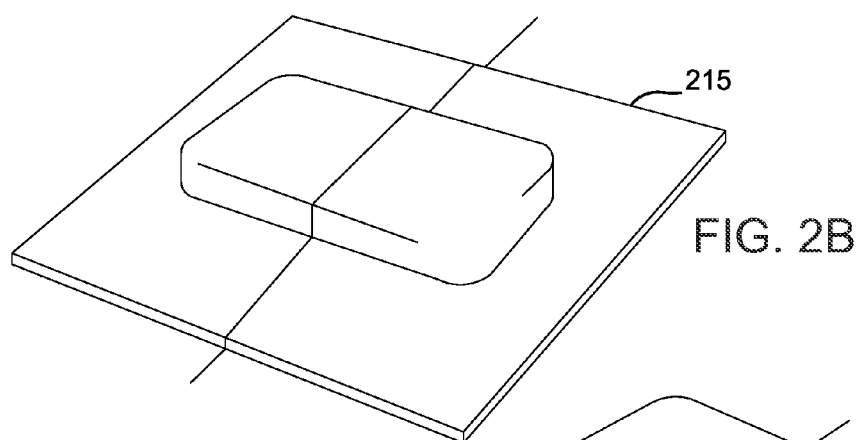
Figure 2C:
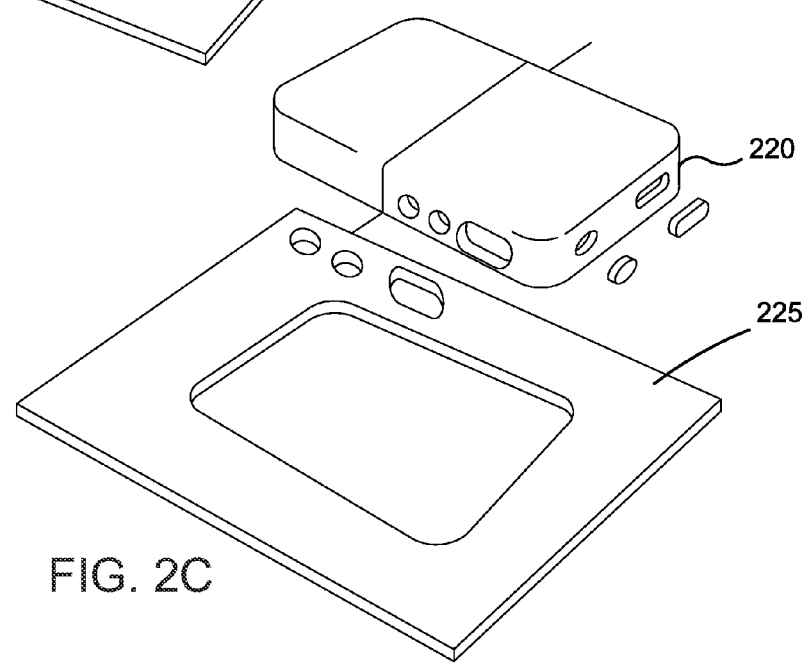

FIGS. 2A-2C depict an embodiment of a process for manufacturing a case in accordance with the present disclosure. First, a sheet 200 of material to be thermo-formed is thermo-formed over a predetermined form 210 as shown in FIGS. 2A and 2B. The thermo-formed sheet 215 may be trimmed to specifications specific to, for example, a particular case and/or personal electronic device design as shown in FIG. 2C. The resulting trimmed thermo-formed thin film outer-layer case 220 may then be inserted into a mold and over-molded with a flexible material comprising flexible inner layer 115 as shown in FIG. 1. Additionally and/or alternatively, thermo-formed thin film outer-layer case 220 may be attached via any attachment method such as mechanical, chemical, adhesive, or welding to a pre-formed flexible inner layer 115 to form a multilayer case.

The trimmed off remainder 225 of thermo-formed sheet 215 may be recycled or discarded. Additionally and/or alternatively sheet 200 may be large enough to be used to thermo-form multiple cases at a single time, and form 210 may embody multiple device forms thereby resulting in multiple thermo-formed thin film outer-layer cases 220 being formed simultaneously.

Sheet 200 may have a pattern or design imprinted onto it by any printing method, such as screening, or stenciling, or may have a design or pattern integrally formed with the sheet 200 before or after thermo-formed thin film outer-layer case 220 is formed.

Figure 3:
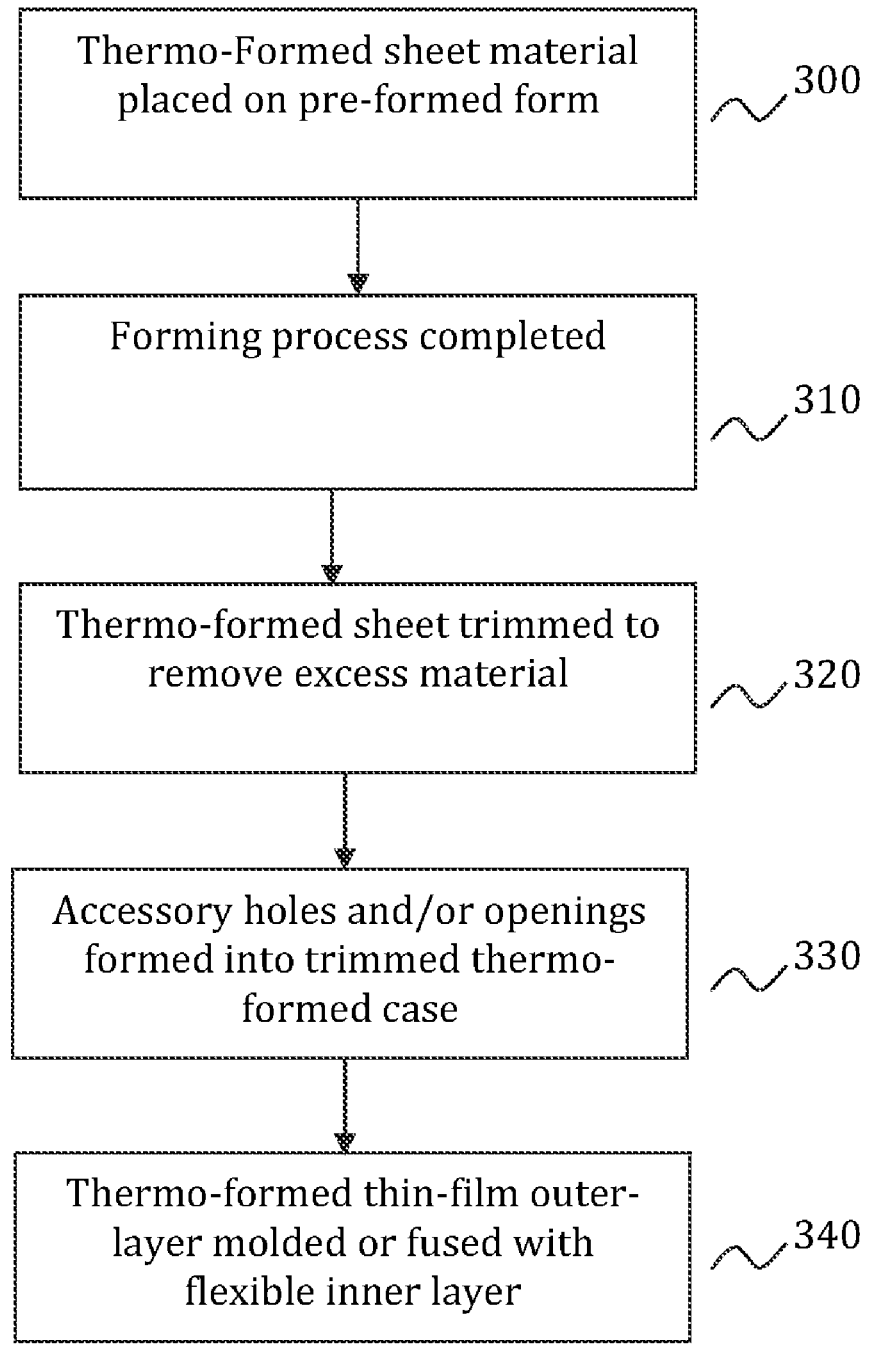
FIG. 3 is a flow diagram of the steps of a method of forming a case in accordance with an embodiment of the present disclosure.

FIG. 3 depicts the steps of the method depicted in FIGS. 2A-2C. At step 300, sheet 200 is placed on predetermined form 210. At step 310 the forming process is executed resulting in a formed sheet 215. For purposes of clarity, thermo-forming is referenced throughout the present disclosure, but it would be understood by one skilled in the art, that the thin-film forming process may be carried out by other processes such as vacuum forming, chemical forming, thermal forming, pressure forming, high pressure forming or compression forming or any combination thereof. At step 320, the formed sheet 215 is trimmed resulting in thermo-formed thin film outer-layer case 220. Thermo-formed thin film outer-layer case 220 may be further finished at step 330 where openings may be added to thermo-formed thin film outer-layer case 220 to accommodate accessories and/or openings required for the finished case. At step 340, thermo-formed thin film outer-layer case 220 may be molded with a flexible inner layer 115 by any known means previously disclosed.

Figure 4:
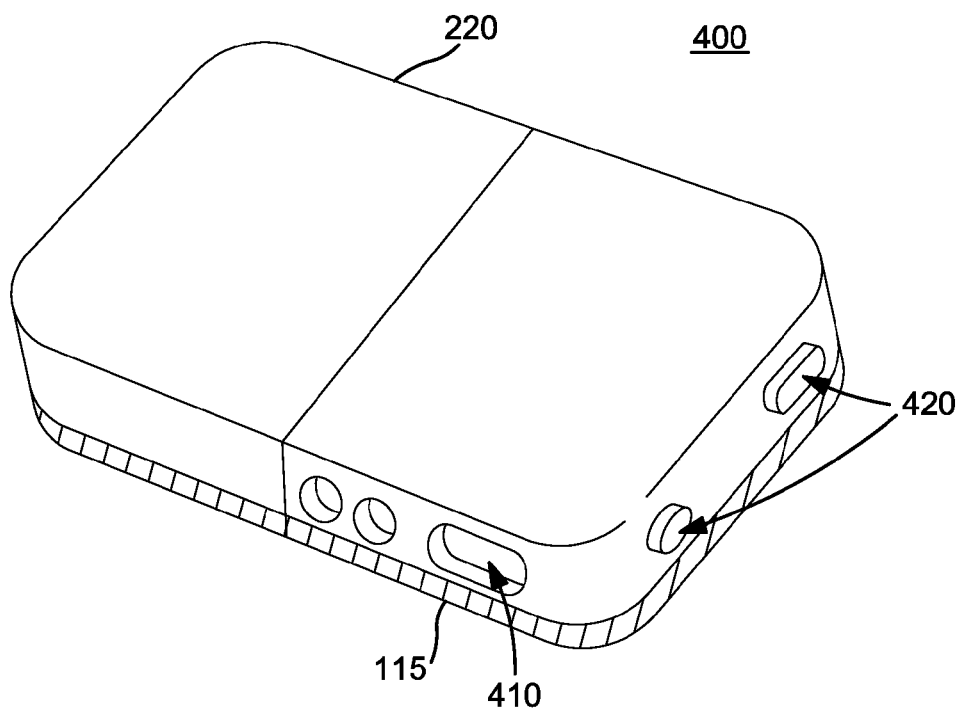
FIG. 4 is a perspective view of a case made in accordance with an embodiment of the present disclosure.

FIG. 4 depicts case 400 formed by an embodiment of the present disclosure. Case 400 comprises flexible inner layer 115, thermo-formed thin film outer-layer case 220, accessory openings 410 and accessory covers or buttons 420. As disclosed with respect to FIG. 3, accessory openings 410 and covers or buttons 420 may be formed during the trimming process.

Those skilled in the art will recognize that the present teachings are amenable to a variety of modifications and/or enhancements. While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The invention claimed is:

1. A case for a portable electronic device comprising:
   a flexible elastomeric inner layer having an inner portion and an outer portion,
      wherein the inner portion has a back portion and a side portion forming an enclosure for the portable electronic device and;
      wherein the flexible elastomeric inner layer has an attachment for retaining the portable electronic device within the enclosure; and
   a thermo-formed thin film outer-layer sized and shaped to cover the outer portion of the flexible elastomeric inner layer.

2. The case of claim 1 wherein the thermo-formed thin film outer layer is attached to the flexible elastomeric inner layer.

3. The case of claim 1 wherein the thermo-formed thin film outer-layer is sufficiently deformable to allow for insertion of the personal electronic device into the enclosure, and
   wherein the thermo-formed thin film outer-layer returns to its original shape after insertion of the personal electronic device into the enclosure.

4. The case of claim 1 wherein the thermo-formed thin film outer-layer is formed from at least one of the following:
   plastic, polyethylene terephthalate, polycarbonate, polypropylen, biaxially oriented polypropylene, oriented polypropylene, styrene, amorphous polyester terephthalate, and biaxially oriented polyethylene terephthalate.

5. The case of claim 1 wherein the flexible elastomeric inner layer is formed from at least one of the following:
   silicone, rubber, neoprene, thermoplastic polyurethane and thermoplastic elastomer.

6. The case of claim 2 wherein the thermo-formed thin film outer layer substantially covers the outer portion of the flexible elastomeric inner layer.

7. The case of claim 1 wherein the thermo-formed thin film outer layer is permanently attached to the flexible elastomeric inner layer by at least one of the following:
   chemical bonding, thermal bonding, co-molding and mechanical attachments.

8. The case of claim 1 wherein the thermo-formed thin film outer-layer has a thermo-formed thin film outer-layer inner surface and a thermo-formed thin film outer-layer outer surface,
   wherein the thermo-formed thin film outer-layer inner surface contacts the outer surface of the flexible elastomeric inner layer, and
   wherein the thermo-formed thin film outer-layer outer surface contains a graphic.

9. The case of claim 8 wherein the thermo-formed thin film outer-layer outer surface is smooth.

10. A method for forming a case for a personal electronic device with a thermo-formed thin film outer-layer and a flexible elastomeric inner layer comprising the steps of:
    applying a sheet of thermo-formed film to a form;
    forming a thin film outer-layer from the thermo-formed film;
    trimming the formed thin film outer-layer to its final configuration;
    attaching the trimmed thin film outer-layer to a flexible elastomeric inner layer.

11. The method of claim 10 wherein the attaching is performed by at least one of the following:
    co-molding, chemical bonding, vibration welding, thermal bonding, and mechanical bonding.

* * * * *